United States Patent

Bick

[15] 3,637,052
[45] Jan. 25, 1972

[54] WAGON RETARDERS

[72] Inventor: David Ewart Bick, Cheltenham, England

[73] Assignee: Dowty Mining Equipment Limited, Ashchurch, Tewkesbury, England

[22] Filed: Aug. 20, 1970

[21] Appl. No.: 65,381

[30] Foreign Application Priority Data

Sept. 12, 1969 Great Britain......................45,107/69

[52] U.S. Cl..............................................188/62, 188/301
[51] Int. Cl................................................................B61k 7/02
[58] Field of Search ..........................188/62, 280, 301, 317; 104/162

[56] References Cited

UNITED STATES PATENTS

| | | | |
|---|---|---|---|
| 3,040,676 | 6/1962 | Checkley et al................... | 188/62 UX |
| 3,107,633 | 10/1963 | Bick..................................... | 188/62 X |

FOREIGN PATENTS OR APPLICATIONS 1,487,902  5/1967  France......................................188/62

*Primary Examiner*—Duane A. Reger
*Attorney*—Young & Thompson

[57] ABSTRACT

A wagon retarder for installation on a railway track has a telescopic cylinder and piston device containing hydraulic fluid and compressed gas, said device being contracted by an approaching wheel and then being extended by the compressed gas as the wheel moves away. The cylinder slides in a fixed guide cylinder, and it slides on the piston which has a piston rod of smaller diameter extending through a sealing device into engagement with the base of the guide cylinder.

The piston carries a flow-sensitive valve which is closable during contraction of the device whereby hydraulic fluid flows from one side of the piston to the other side through a pressure relief valve. The relief valve generates a pressure which acts on the cylinder to exert a retarding force against the wagon wheel. During extension of the device, the flow-sensitive valve opens to enable hydraulic fluid to flow in the reverse direction across the piston.

9 Claims, 2 Drawing Figures

PATENTED JAN 25 1972

3,637,052

INVENTOR
DAVID EWART BICK
BY
Young & Thompson
ATTORNEYS

WAGON RETARDERS

This invention relates to wagon retarders of the kind in which the movement of a wagon wheel along a rail is opposed by a hydraulic device acting against the periphery of the wheel.

In a known form of such retarder, a hydraulic cylinder member is mounted substantially vertically against a rail, while a piston member slidable in the cylinder member has a head engageable by a wagon wheel rolling along the rail, whereby the piston member moves downwardly in the cylinder member against fluid pressure resistance at wagon speeds above a critical value. This construction requires a main seal arranged between the piston and cylinder members and acting between the sliding surfaces of greatest diameter.

According to the present invention, a wagon retarder for installation on a railway track comprises a hydraulic cylinder with a rod extending in slidable sealing engagement through one end thereof, a member engageable by a wagon wheel when said wheel approaches the member to cause telescopic contraction of the hydraulic cylinder and the rod, a piston fixedly associated with the rod and engaging the bore of the cylinder, said bore having a diameter greater than that of the rod, valve means affording displacement of hydraulic fluid from one side of the piston to the other side upon relative movement of the cylinder and the piston and capable of generating a fluid pressure on that side of the piston from which hydraulic fluid is displaced during telescopic contraction whereby a retarding force is exerted against the wheel, and spring means acting to cause telescopic extension of the hydraulic cylinder and the rod when the wheel rolls away from said member.

The hydraulic cylinder may be slidably mounted in a guide cylinder which is fixable in a generally upright position to one side of a track rail, the said member is a head portion of the hydraulic cylinder, and the rod is fixedly supported by the base of the guide cylinder. The transverse component of wheel impact force is therefore sustained by bearings in the guide cylinder.

The diameter of the rod may therefore be small compared with that of the bore in which the piston slides and this simplifies the problem of providing a reliable piston rod seal.

One embodiment of the present invention is shown in the accompanying drawings, of which:

Figures 1, 2:
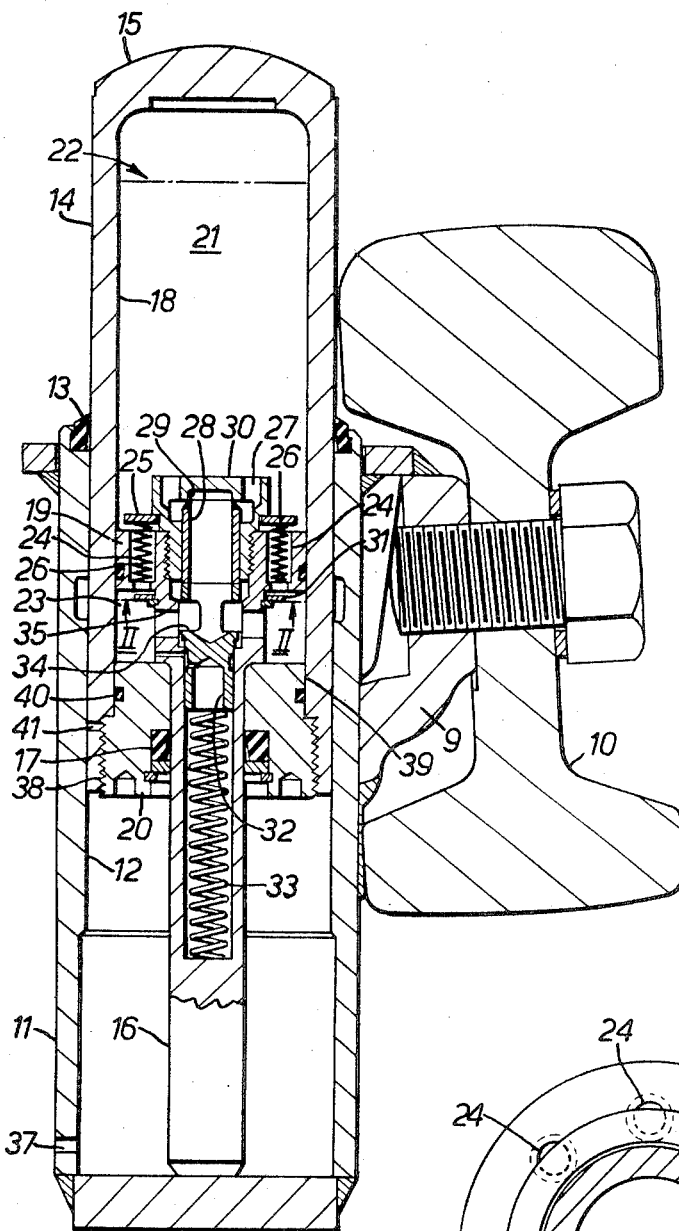
FIG. 1 is a longitudinal sectional view of a wagon retarder.
FIG. 2 is a transverse sectional view of a detail on the line II—II of FIG. 1.

A guide cylinder 11 is adapted by a mounting bracket 9 to be fixed in an upright position against the side of a rail 10. The guide cylinder has a uniform bore 12 extending from its upper end where a scraper ring 13 is fixed. A hydraulic cylinder 14 is slidable in the bore 12. The upper end portion of the hydraulic cylinder is formed as a domed head 15 which is engageable by the flange of a wagon wheel rolling along the rail and over the device.

The lower end of the hydraulic cylinder 14 is closed by a screw plug 20 which has a central opening and sealing ring 17 through which a rod 16 extends slidably. The hydraulic cylinder has a bore 18 in which a piston 19 is slidable, this piston being integral with the rod 16. The rod 16 has a diameter which is small compared with that of the bore 12. The rod 16 rests on the base of guide cylinder 11 under the weight of the hydraulic cylinder 14 and contents. The piston 19 divides the bore 18 into two chambers, the upper one 21 of which contains hydraulic fluid up to the level 22, and above that gas which is compressed to act as a spring for extending the hydraulic cylinder 14 and the rod 16 telescopically. The lower chamber 23 contains hydraulic fluid.

The piston is provided with valve means which includes a series of holes 24 across the piston closable by a flow-sensitive valve member 25. Springs 26 in the holes 24 urge the valve member 25 away from the holes 24 towards a stop surface formed on a retainer 30 which is screwed into the piston.

When the rate of flow of fluid from the chamber 21 to the chamber 23 is caused by wheel speed in excess of a predetermined value, the fluid pressure load acting on the flow-sensitive valve member 25 overcomes the load of the springs 26 and causes the valve to engage the adjacent end face of the piston 19, thereby closing the holes 24. The predetermined value may be adjusted by varying the number of springs 26 in diametral pairs, or by substituting springs of different load.

The valve means also includes a relief valve having a hollow cylindrical valve member 28 which is slidably mounted in a bore in the retainer 30, and a valve seat 29, of less diameter than the bore, which is arranged inside the main valve member 28. Fluid access from the chamber 21 to the valve member 28 is through a number of holes 27 in the retainer 30. Fluid pressure in the chamber 21 therefore acts on the annular area of the valve member 28 between the valve seat and the bore. The valve thus allows high flow while using only a small spring.

A spring 33 seated within the rod 16 acts through a plunger 32 to load the main valve member 28 against the seat 29. The interior of the valve member 28 communicates with the chamber 23 through openings 34 in the plunger 32 and openings 35 in the piston 19.

A damping valve is provided having a clack plate 31 which cooperates with the holes 24 upon return flow to the chamber 21 to limit the rate of extension of the hydraulic cylinder 14 in the guide 11.

The clack plate 31, see FIG. 2, has a circumference such that when the valve engages the underside of the piston 19 during return flow from the chamber 23 to the chamber 21, a larger part of the area of the holes 24 is closed. The reduction in extension speed thereby achieved prevents the hydraulic cylinder 14 from jumping out of the guide cylinder.

A breather hole 37 opens from the airspace between the hydraulic cylinder 14 and the base of the guide cylinder 11.

The screwplug 20 has a screw-threaded portion 38 engaging an internal screw thread in the lower part of the hydraulic cylinder 14, and a spigot portion 39 fitted with a sealing ring 40 engaging the bore 18. A charging hole 41 is formed in the cylinder 14 at the base of the screw thread.

In the final stage of assembly, the hydraulic cylinder 14 is inverted and filled with a measured quantity of hydraulic fluid, after which the screwplug 20 is initially engaged so that the sealing ring 40 is clear of the bore 18. An inert gas under pressure is then applied to the charging hole 41 and is maintained while the screwplug 20 is screwed in fully. The sealing ring 40 then enters the bore 18 to isolate the hole 41 from the interior of the cylinder 14.

In operation, the flange of a wheel travelling at low speed along the rail engages the domed head 15 so that the hydraulic cylinder 14 moves downwardly as the rotational axis of the wheel approaches a position vertically over the domed head 15. The rod 16 and piston 19 do not move so that fluid is displaced from the contracting chamber 21 to the expanding chamber 23 through the holes 24 in the piston. The flow-sensitive valve member 25 does not close the holes 24 at low wheel speeds. There is therefore a relative small resistance to downward movement of the cylinder 14 provided by the moderate pressure of gas in the upper part of the chamber 21. The gas pressure serves merely as spring means to extend the device as the wheel axis moves away from the piston vertically over the head 15. Fluid then flows from the chamber 23 to the chamber 21 at a rate determined by the partial closure of the holes 24 by the clack plate 31.

At wheel speeds above a predetermined value, the flow-sensitive valve 25 closes, so that fluid displaced from the chamber 21 has to flow through the relief valve 27. This relief valve is set to generate a pressure in the chamber 21 which resists downward movement of the hydraulic cylinder 14, and therefore causes the head 15 to exert a retarding force against the wheel.

The volume of compressed gas above the level 22 is small compared with the total displacement of fluid from the chamber 21 because it has only to accommodate the total fluid volume displaced by the rod 16, and to allow for thermal expansion of the liquid. The small volume of compressed gas above the level 22 serves also to cushion the initial impact of a wagon wheel on the retarder.

The retarder may be adapted to operate at all speeds by the simple expedient of having no springs 26 acting on the valve member 25. The valve member 25 will therefore close the holes 24 at all speeds when the hydraulic cylinder 14 moves downwardly. A number of retarders, thus adapted, may be installed at the end of sidings to bring wagons to rest.

The retarder in the embodiment described is attached to what is known as a bullhead rail, wherein the width of the base portion does not differ substantially from the width of the top portion. If the retarder is for use with flat-bottomed rails, wherein the base portion is substantially wider than the top portion, a part of the base portion may be cut away to allow the guide cylinder to be secured to the central web of the rail whereby the hydraulic cylinder lies close to the top portion of the rail.

An alternative embodiment of the retarder may be attached to a flat-bottomed rail by a wider bracket so that the base portion of the rail does not have to be cut away. The hydraulic cylinder is then spaced from the top portion of the rail, but is provided with a head which projects towards the top portion for engagement by the wheel flanges. In another arrangement the guide cylinder is fixed in a generally upright position, though inclined from the true vertical, whereby it is clear of the flat bottom of the rail, while the head of the hydraulic cylinder is movable close to the top portion of the rail.

I claim:

1. A wagon retarder for installation on a railway track, comprising a hydraulic cylinder with a rod extending in slidable sealing engagement through one end thereof, a member engageable by a wagon wheel when said wheel approaches the member to cause telescopic contraction of the hydraulic cylinder and the rod, a piston fixedly associated with the rod and engaging the bore of the cylinder, said bore having a diameter greater than that of the rod, valve means affording displacement of hydraulic fluid from one side of the piston to the other side upon relative movement of the cylinder and the piston and capable of generating a fluid pressure on that side of the piston from which hydraulic fluid is displaced during telescopic contraction whereby a retarding force is exerted against the wheel, and spring means acting to cause telescopic extension of the hydraulic cylinder and the rod when the wheel rolls away from said member.

2. A wagon retarder according to claim 1, wherein the hydraulic cylinder is slidably mounted in a guide cylinder which is fixable in a generally upright position to one side of a track rail, the said member is a head portion of the hydraulic cylinder, and the rod is fixedly supported by the base of the guide cylinder.

3. A wagon retarder according to claim 2, wherein the valve means is carried by the piston, whereby it is held stationary by the guide cylinder during movement of the hydraulic cylinder, said valve means including a flow-sensitive valve, arranged to close when the hydraulic cylinder is depressed by a wagon wheel having a speed which exceeds a predetermined value, and a relief valve which opens after the flow-sensitive valve has closed.

4. A wagon retarder according to claim 3, wherein the relief valve comprises a hollow cylindrical valve member slidable in a bore and loaded by a spring against a seat of less diameter than the bore within the piston, the interior of the cylindrical valve member forming a passage through which hydraulic fluid is discharged from the one side of the piston to the other side.

5. A wagon retarder according to claim 2, wherein the guide cylinder has a uniform bore extending from the upper end thereof, and wherein the hydraulic cylinder is retained in said bore by its own weight.

6. A wagon retarder according to claim 5, including a damping valve arranged to restrict the rate of flow of hydraulic fluid across the piston during telescopic extension of the hydraulic cylinder and the rod.

7. A wagon retarder according to claim 2, wherein the head portion has a domed surface and wherein the hydraulic cylinder is free to turn in the guide cylinder.

8. A wagon retarder according to claim 2, wherein the spring means is provided by a volume of compressed gas in the upper part of the hydraulic cylinder from which hydraulic fluid is displaced during telescopic contraction.

9. A wagon retarder according to claim 8, wherein a hole is formed through the end portion of the cylinder from which the rod extends, said end portion being adapted to receive a screwplug which carries a sealing ring in a position to lie clear of the bore of the cylinder when the screwplug is initially engaged in the cylinder so as to provide access to the cylinder for compressed gas applied to the hole, the sealing ring entering the bore when the plug is fully engaged in said end portion.

* * * * *